United States Patent
Jabbar et al.

(10) Patent No.: US 10,244,464 B2
(45) Date of Patent: Mar. 26, 2019

(54) SYSTEM AND METHOD FOR EVALUATING NON-OPTIMAL ROAMING OF A CLIENT DEVICE

(71) Applicant: General Electric Company, Schenectady, NY (US)

(72) Inventors: Abdul Jabbar, Niskayuna, NY (US); Matthew Richard Pekarske, Halfmoon, NY (US); Marc Robert Pearlman, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 15/343,211

(22) Filed: Nov. 4, 2016

(65) Prior Publication Data

US 2018/0132170 A1    May 10, 2018

(51) Int. Cl.
| | |
|---|---|
| H04W 24/02 | (2009.01) |
| H04W 36/36 | (2009.01) |
| H04W 48/18 | (2009.01) |
| H04W 48/20 | (2009.01) |
| H04W 84/12 | (2009.01) |
| H04W 88/08 | (2009.01) |

(52) U.S. Cl.
CPC ......... *H04W 48/18* (2013.01); *H04W 24/02* (2013.01); *H04W 36/36* (2013.01); *H04W 48/20* (2013.01); *H04W 84/12* (2013.01); *H04W 88/08* (2013.01)

(58) Field of Classification Search
CPC ..... H04W 24/02; H04W 48/18; H04W 48/20; H04W 84/12; H04W 88/08
See application file for complete search history.

(56) References Cited

U.S. PATENT DOCUMENTS

| 7,706,789 B2 | 4/2010 | Qi et al. |
| 7,907,582 B2 | 3/2011 | Du et al. |

(Continued)

FOREIGN PATENT DOCUMENTS

AU  2004321459 B2  1/2010

OTHER PUBLICATIONS

Chen et al., "Seamless roaming in wireless networks for video streaming", 2005 IEEE International Symposium on Circuits and Systems, vol. 4, pp. 3255-3258, May 23-26, 2005.

(Continued)

*Primary Examiner* — Kashif Siddiqui

(57) ABSTRACT

A method for evaluating non-optimal roaming of a client device in a communication network is presented. The method includes detecting a transition of the client device from a first access point to a second access point and evaluating at least one performance parameter corresponding to each of the first access point and the second access point after the client device transitions from the first access point to the second access point. Further, the method includes determining a number of one of flip-flop events and undesirable roam events based on the evaluation of the at least one performance parameter. Also, the method includes identifying the non-optimal roaming of the client device based on one of the number of flip-flop events and the number of the undesirable roam events. Furthermore, the method includes modifying at least one roaming algorithm to achieve optimal roaming of the client device in the communication network.

13 Claims, 4 Drawing Sheets

(56) References Cited

U.S. PATENT DOCUMENTS

| | | |
|---|---|---|
| 8,452,281 B2 | 5/2013 | Salomone |
| 8,767,672 B2 | 7/2014 | Soomro et al. |
| 2004/0039817 A1 | 2/2004 | Lee et al. |
| 2005/0059400 A1* | 3/2005 | Jagadeesan ........... H04W 36/30 455/436 |
| 2006/0187878 A1* | 8/2006 | Calhoun ........... H04W 36/0033 370/331 |
| 2007/0014261 A1* | 1/2007 | Lee ....................... H04W 36/32 370/331 |
| 2008/0075035 A1 | 3/2008 | Eichenberger |
| 2008/0253314 A1* | 10/2008 | Stephenson ........... H04W 24/08 370/326 |
| 2008/0293405 A1* | 11/2008 | Meyer ................... H04W 48/18 455/432.1 |
| 2009/0088152 A1 | 4/2009 | Orlassino |
| 2009/0274118 A1* | 11/2009 | De Sanctis ......... H04W 36/245 370/331 |
| 2012/0077502 A1* | 3/2012 | Liu .................... H04W 36/245 455/438 |
| 2013/0150012 A1* | 6/2013 | Chhabra ............... H04W 48/16 455/418 |
| 2015/0264614 A1 | 9/2015 | Stager et al. |

OTHER PUBLICATIONS

Wilharm et al., "Synchronized Wireless Local Area Networks", Wireless Communication Systems (ISWCS 2013), Proceedings of the Tenth International Symposium on, pp. 1-5, Aug. 27-30, 2013.
International Search Report and Written Opinion issued in connection with corresponding PCT Application No. PCT/US2017/059717 dated Mar. 28, 2018.

\* cited by examiner

SYSTEM AND METHOD FOR EVALUATING NON-OPTIMAL ROAMING OF A CLIENT DEVICE

BACKGROUND

Embodiments of the present specification relate generally to a communication network, and more particularly to a system and method for evaluating non-optimal roaming of a client device in the communication network.

Typically, a wireless local area network (WLAN) is used for providing wireless communication between client devices. In one example, the WLAN may be used in hospitals or office buildings to provide communication between client devices such as patient monitoring devices, laptops, handheld devices, and servers that are located within a coverage area of the WLAN. In general, the WLAN network includes a plurality of access points (APs) that is strategically located at different locations to provide a desired coverage area to the client devices. Further, when a client device enters the WLAN, the client device may associate itself with one of the access points to communicate application data to an end device or another client device. Also, the client device may roam freely by transitioning from one access point (AP) to another AP within the coverage area of the WLAN. However, for roaming within the WLAN, the client device may have to follow a roaming process during which the client device may be unable to communicate application data to the end device. As a result, application data flow in the WLAN may be interrupted or lost.

In the current systems, efforts have been made to minimize the loss of application data. One of the efforts is to control the roaming process or reduce roaming time of the client devices in the WLAN. Current methods for reducing the roaming time of the client devices rely on predictive techniques. Moreover, in the presently available systems, optimal roaming of the client devices is configured using a static design of the wireless network. However, the roaming performance of the client devices is dependent on operating conditions of the wireless network that is dynamic in nature. Consequently, configuring the optimal roaming of the client devices using the static design of the wireless network, for example using fixed thresholds, fails to improve the roaming performance and/or minimize the application data loss.

BRIEF DESCRIPTION

In accordance with aspects of the present specification, a method for evaluating non-optimal roaming of a client device in a communication network is presented. The method includes detecting a transition of the client device from a first access point to a second access point in the communication network. Also, the method includes evaluating at least one performance parameter corresponding to each of the first access point and the second access point after the client device transitions from the first access point to the second access point. Further, the method includes determining a number of one of flip-flop events and undesirable roam events based on the evaluation of the at least one performance parameter corresponding to each of the first access point and the second access point. In addition, the method includes identifying the non-optimal roaming of the client device based on one of the number of flip-flop events and the number of the undesirable roam events. Furthermore, the method includes modifying at least one roaming algorithm associated with the client device to achieve optimal roaming of the client device in the communication network.

In accordance with another aspect of the present specification, a client device for evaluating non-optimal roaming in a communication network is presented. The client device includes a transceiver configured to detect that the client device is transitioned from a first access point to a second access point in the communication network. Also, the client device includes a processor coupled to the transceiver and configured to evaluate at least one performance parameter corresponding to each of the first access point and the second access point after the client device transitions from the first access point to the second access point. Further, the processor is configured to determine a number of one of flip-flop events and undesirable roam events based on the evaluation of the at least one performance parameter corresponding to each of the first access point and the second access point. In addition, the processor is configured to identify the non-optimal roaming of the client device based on one of the number of flip-flop events and the number of undesirable roam events. Furthermore, the processor is configured to modify at least one roaming algorithm associated with the client device to achieve optimal roaming of the client device in the communication network.

In accordance with yet another aspect of the present specification, a method for evaluating non-optimal roaming of a client device in a communication network is presented. The method includes detecting a transition of the client device from a first access point to a second access point in the communication network. Also, the method includes evaluating at least one performance parameter corresponding to each of the first access point and the second access point. Further, the method includes determining a number of one of non-scan events and non-roam events based on the evaluation of the at least one performance parameter corresponding to each of the first access point and the second access point. In addition, the method includes identifying the non-optimal roaming of the client device based on one of the number of non-scan events and the number of the non-roam events. Furthermore, the method includes modifying at least one roaming algorithm associated with the client device to achieve optimal roaming of the client device in the communication network.

In accordance with another aspect of the present specification, a client device for evaluating non-optimal roaming in a communication network is presented. The client device includes a transceiver configured to verify that the client device is communicatively coupled to a first access point. Also, the client device includes a processor coupled to the transceiver and configured to detect a transition of the client device from a first access point to a second access point in the communication network. Further, the processor is configured to evaluate at least one performance parameter corresponding to each of the first access point and the second access point. In addition, the processor is configured to determine a number of one of non-scan events and non-roam events based on the evaluation of the at least one performance parameter corresponding to each of the first access point and the second access point. Furthermore, the processor is configured to identify the non-optimal roaming of the client device based on one of the number of non-scan events and the number of the non-roam events. In addition, the processor is configured to modify at least one roaming algorithm associated with the client device to achieve optimal roaming of the client device in the communication network.

DRAWINGS

These and other features, aspects, and advantages of the present disclosure will become better understood when the following detailed description is read with reference to the accompanying drawings in which like characters represent like parts throughout the drawings, wherein.

Figure 3:
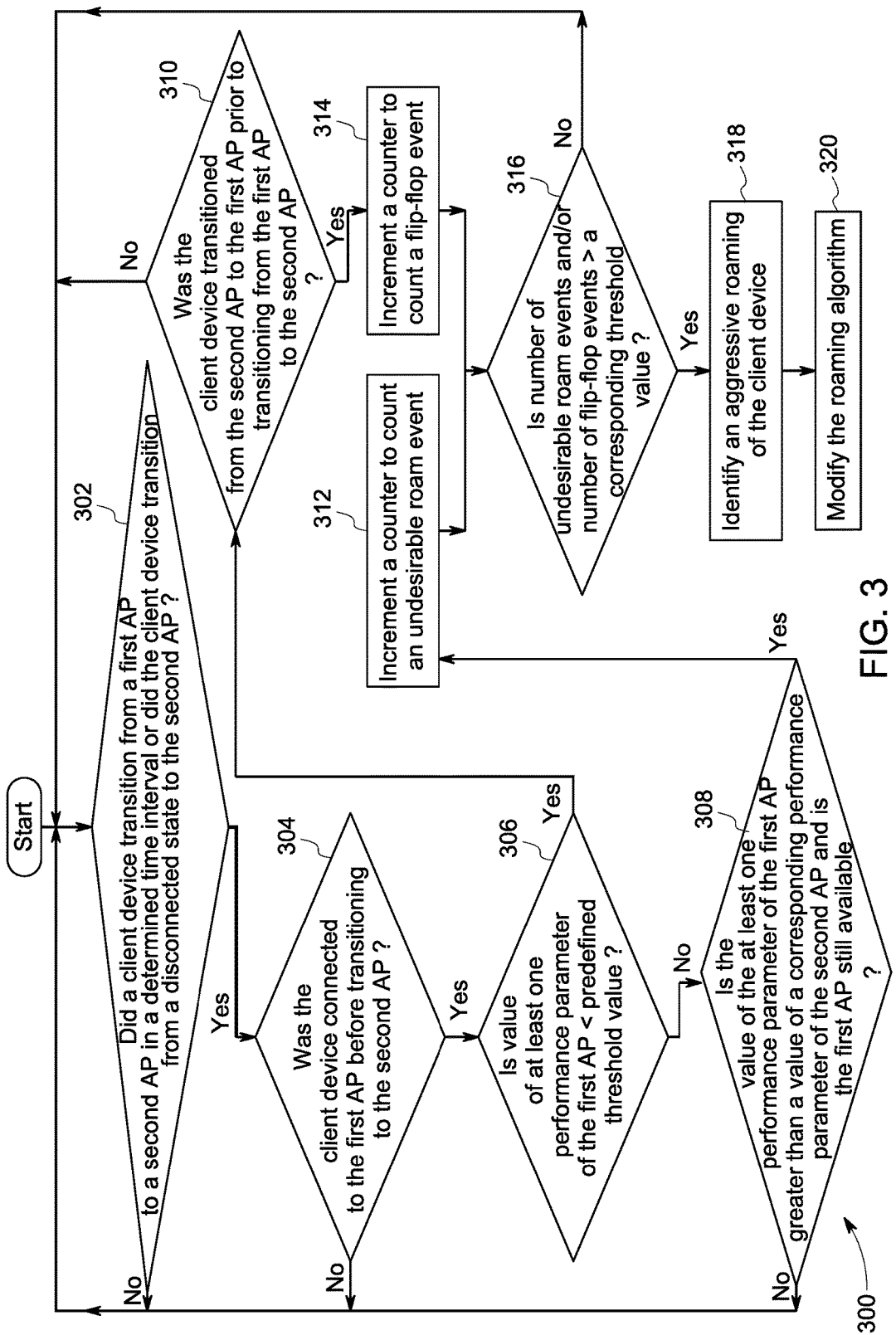
Figure 4:
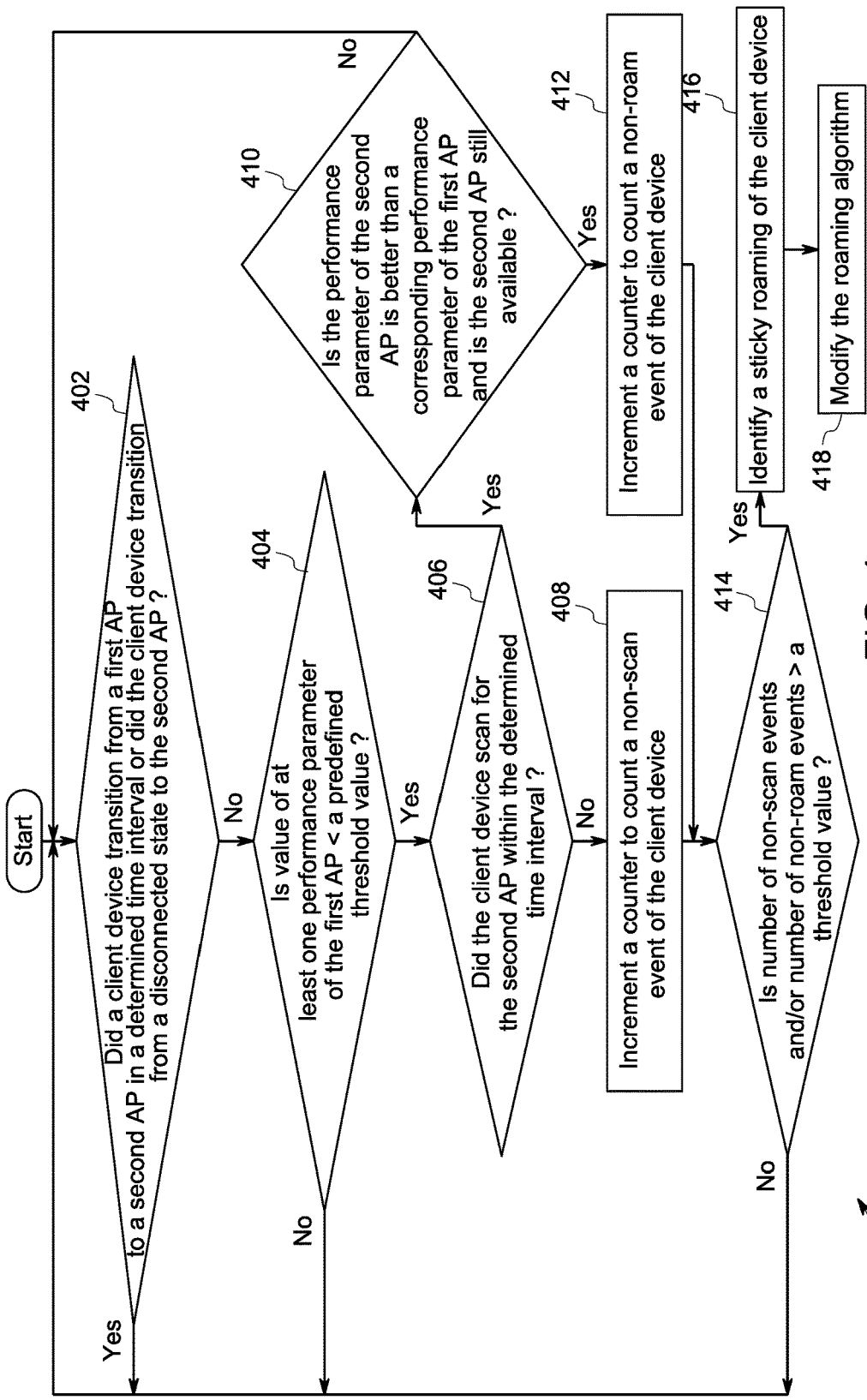

FIG. 3 is a flow chart illustrating a method for evaluating non-optimal roaming of the client device by detecting aggressive roaming of the client device in the communication network, in accordance with aspects of the present specification; and FIG. 4 is a flow chart illustrating another method for evaluating non-optimal roaming of the client device by detecting sticky roaming of the client device in the communication network, in accordance with aspects of the present specification.

DETAILED DESCRIPTION

As will be described in detail hereinafter, various embodiments of systems and methods for evaluating roaming performance of a client device are presented. In particular, the systems and methods presented herein evaluate non-optimal roaming of the client device by identifying aggressive roaming and/or sticky roaming of the client device in a communication network. Also, the client device may notify poor roaming performance of the client device by displaying one or more messages to a user of the client device.

Figure 1:
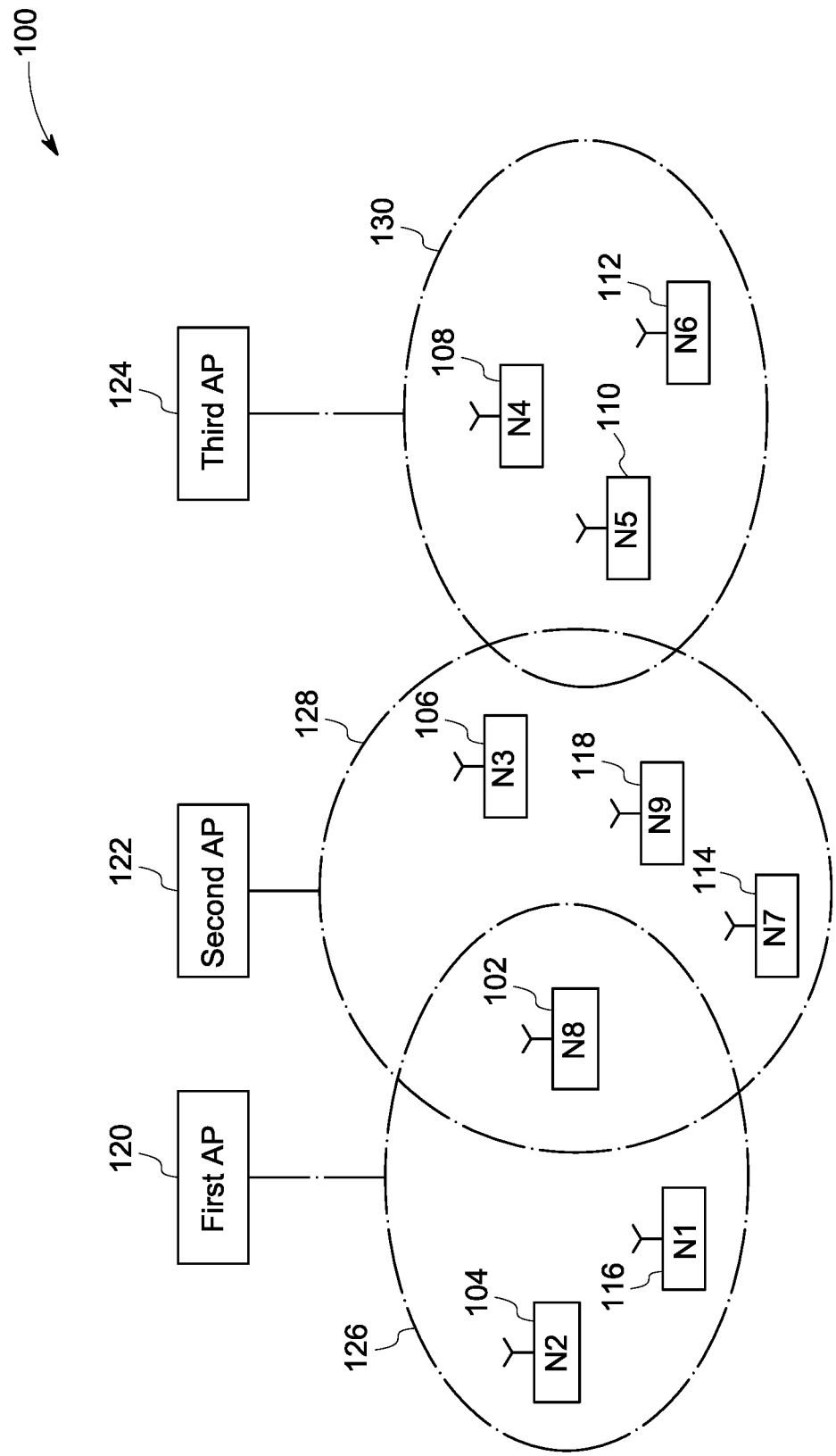
FIG. 1 is a diagrammatical representation of a communication network, in accordance with aspects of the present specification.

FIG. 1 illustrates a diagrammatical representation of a communication network 100, in accordance with aspects of the present specification. The communication network 100 may be used to provide wireless communication between client devices 102, 104, 106, 108, 110, 112, 114, 116, and 118 (hereinafter referred to as client devices 102-118). In one example, the communication network 100 may be a wireless local area network (WLAN). Further, the client devices 102-118 may include cell phones, personal digital assistants (PDAs), laptops, handheld devices, patient monitoring devices, servers, and the like. In one embodiment, the communication network 100 may be used in a hospital or a medical center to facilitate wireless communication of medical data from one or more patient monitoring devices to an infrastructure system or servers. In one example, this medical data may be collected in real-time to continuously monitor or analyze the condition of a patient.

In a presently contemplated configuration, the communication network 100 includes one or more access points (APs) 120, 122, 124 that are strategically situated at different locations to provide a desired coverage area to the client devices 102-118. It may be noted that an access point (AP) is typically a wireless networking device that transmits and receives data and manages connection of the client devices 102-118. Also, in one example, the AP may serve as a point of interconnection between the WLAN and a fixed wire network. Further, each of the APs 120, 122, 124 is used to establish wireless communication with the client devices 102-118 that are within a transmission range or region 126, 128, 130 of the corresponding AP. Also, the client devices 102-118 may roam freely within the communication network 100 by transitioning from a current AP to a new AP. For ease of understanding, the current AP may be referred as a first AP 120, while the new AP may be referred as a second AP 122. Also, in FIG. 1, for ease of illustration, the client device 102 is depicted as roaming or transitioning from the first AP 120 to the second AP 122. However, the client device 102 may roam from any AP to any other AP in the communication network 100.

Further, the client device 102 may have to follow a roaming process for transitioning from the first AP 120 to the second AP 122. In one embodiment, the roaming process may include steps such as hand-off initiation, scanning, and re-authentication. In the hand-off initiation step, the client device 102 that is associated with the first AP 120 may search or monitor for the second AP 122 based on degradation of one or more performance parameters of the first AP 120. These performance parameters may include received signal strength (RSS), data latency, data loss of the application data communicated to a corresponding AP, and the like. In the scanning step, the client device 102 may scan for one or more channels to locate the second AP 122. Further, in the re-authentication step, the client device 102 may connect/associate itself with the second AP 122 and provide authentication to the second AP 122 to communicate the application data.

However, during the roaming process, the client device 102 may consume a majority of the time searching for the second AP 122. As a result, the client device 102 may be unable to communicate the application data, such as the medical data to the first AP 120 or the second AP 122. Consequently, application data flow in the communication network 100 may be interrupted or the application data may be lost. Loss of application data, especially in the medical field, may disadvantageously affect the monitoring and/or analyzing the condition of the patient.

To overcome these aforementioned problems or shortcomings with the currently available systems, the exemplary client devices 102-118 are configured to reduce the roaming process and/or roaming time in the communication network 100, which in turn minimize the data loss or interruption of application data flow in the communication network 100. Particularly, each client device 102 may be configured to identify improper or non-optimal roaming in the communication network 100. In one example, the non-optimal roaming may include aggressive roaming and sticky roaming of the client device 102.

The "aggressive roaming" of the client device 102 may be representative of unnecessary/undesirable roaming of the client device 102 in the network 100 or flip-flopping of the client device 102 between two access points (APs) in the communication network 100. It may be noted that the terms "aggressive roaming" and "aggressive roaming state" may be used interchangeably in the present specification. In a similar manner, the "sticky roaming" of the client device 102 may be representative of a failure of the client device 102 to transition from the first AP 120 to the second AP 122 especially in situations where the first AP 120 has one or more poorly performing performance parameters and the second AP 122 has stronger corresponding performance parameters. It may be noted that the terms "sticky roaming" and "sticky roaming state" may be used interchangeably in the present specification. The aspect of identifying the non-optimal roaming of the client device 102 will be explained in greater detail with reference to FIGS. 2-4. Furthermore, the processor is configured to modify at least one roaming algorithm associated with the client device 102 to achieve optimal roaming of the client device in the communication network 100.

In accordance with aspects of the present specification, if a non-optimal roaming condition of the client device 102 in the communication network 100 is detected/identified, the client device 102 may modify and/or improve the roaming algorithm/technique associated with the client device 102 to achieve optimal roaming in the communication network 100. In certain other embodiments, in response to the identified non-optimal roaming condition of the client device 102, the client device 102 may also be configured to select a new/different roaming algorithm/technique to achieve optimal roaming in the communication network 100. Consequently, the roaming process and/or roaming time of the client device 102 may be substantially reduced, which in turn reduces/minimizes the application data loss or interruption of the application data flow in the communication network 100. Also, the client device 102 may alert the user about the non-optimal roaming of the client device 102 by displaying one or more messages on the client device 102. In addition, the client device 102 may collect data associated with the aggressive roaming state and/or the sticky roaming state of the client device 102 associated with each of the roaming algorithms used in the communication network 100. Further, the client device 102 may use this data to evaluate the effectiveness of each of the roaming algorithms in the communication network 100.

Figure 2:
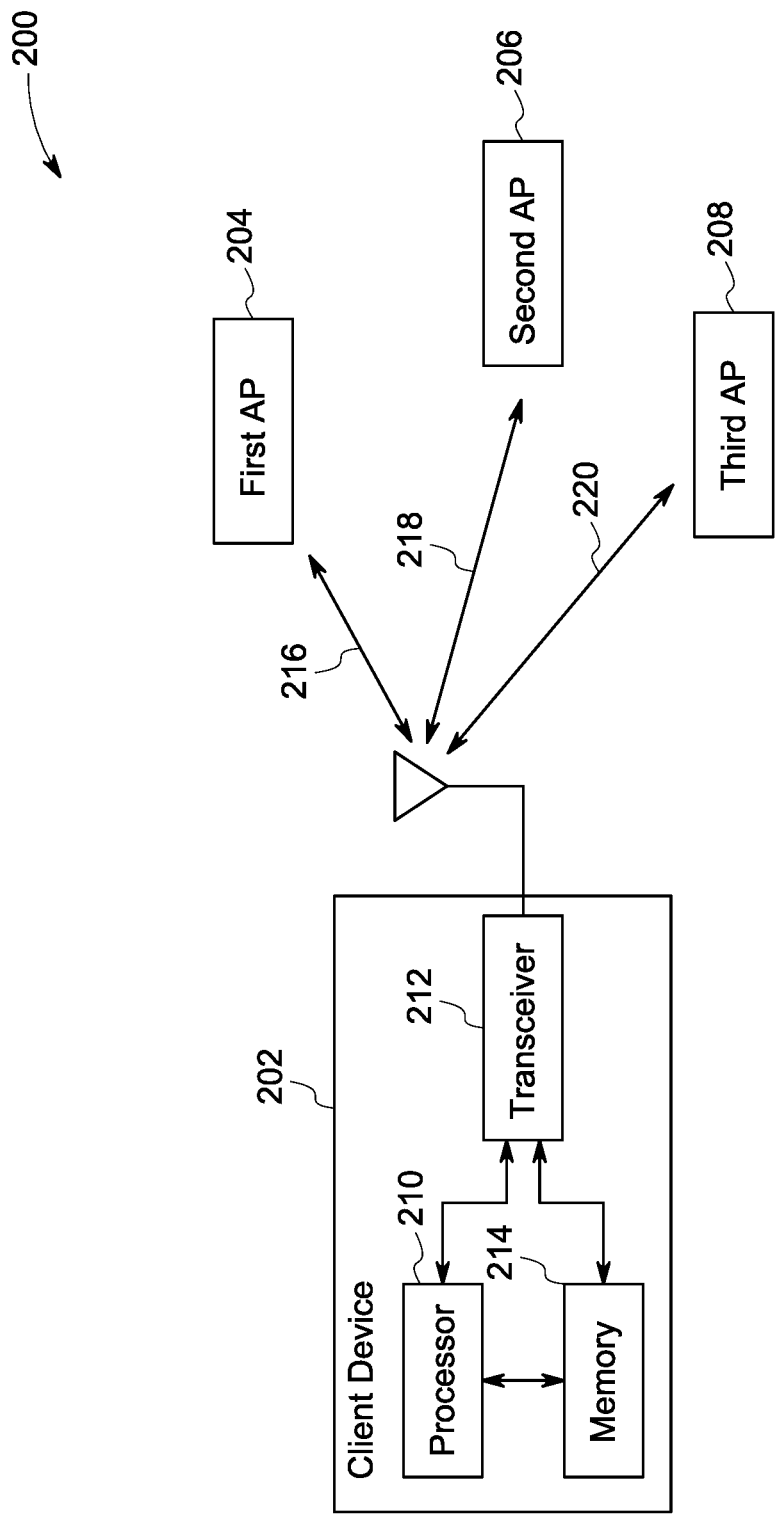
FIG. 2 is a diagrammatical representation of a client device communicating with access points in the communication network to evaluate non-optimal roaming of the client device, in accordance with aspects of the present specification.

Referring to FIG. 2, a diagrammatical representation of a communication network 200 having a client device 202 communicating with access points 204, 206, 208, in accordance with aspects of the present specification, is depicted. The client device 202 may be representative of the client device 102 of FIG. 1. In a similar manner, the first access point 204 may be representative of a first access point 120, the second access point 206 may be representative of a second access point 122, and the third access point 208 may be representative of a third access point 124 of FIG. 1. Initially, the client device 202 may be associated or communicatively coupled to the first access point 204. Further, the client device 202 may roam or transition from the first AP 204 to the second AP 206 or the third AP 208.

In a presently contemplated configuration, the client device 202 may include a processor 210, a transceiver 212, and a memory 214. It may be noted that the client device 202 may include other components or hardware, and is not limited to the components shown in FIG. 2. The processor 210 may be electrically/communicatively coupled to the transceiver 212 and the memory 214. Also, the transceiver 212 may be electrically/communicatively coupled to the memory 214. Further, the processor 210 may communicate application data to the first AP 204 via the transceiver 212 and one or more channels 216, 218, 220. By way of example, the first AP 204 may be associated with a first channel 216, the second AP 206 may be associated with a second channel 218, and the third AP 208 may be associated with a third channel 220. Moreover, the processor 210 may follow a roaming process to connect the client device 202 with one of the APs, for example the first AP 204. Also, in this example, the transceiver 212 may be tuned to the first channel 216 corresponding to the first AP 204 to facilitate communication of the application data from the client device 202 to the first AP 204.

Furthermore, the processor 210 may evaluate one or more performance parameters corresponding to each of the APs 204, 206, 208. The performance parameters may include received signal strength (RSS), data latency, data loss, and the like associated with each of the APs 204, 206, 208. The RSS may indicate a signal strength in a corresponding channel associated with each of the APs 204, 206, 208. Also, the data latency may indicate a delay in communicating the application data in a corresponding channel associated with each of the APs 204, 206, 208. In one embodiment, the data latency may be determined based on the time interval between an instance at which a data frame is transmitted from the client device 202 to an associated AP and an instance at which an acknowledgement is received by the client device 202 from the associated AP. In one example, the data latency includes media access control (MAC) frame latency.

Similarly, the data loss may indicate loss of application data while the client devices are communicating via a corresponding channel associated with each of the APs 204, 206, 208. In one embodiment, the data loss may be determined based on a number of data packets at the client device 202 that are unacknowledged by the associated AP. In one example, the data loss may include MAC) frame loss. In one embodiment, the memory 214 may store the performance parameters of each of the APs 204, 206, 208. Also, the memory 214 may store a scan list that includes one or more neighboring APs and their corresponding channels. The processor 214 may use the scan list to transition or roam from one AP to another AP, for example from the first AP 204 to the second AP 206.

Moreover, the processor 210 may verify whether at least one performance parameter of the first AP 204 is below a predefined threshold value. By way of example, the processor 210 may verify whether a value of the RSS corresponding to the first AP 204 is below a predefined threshold value. Also, the processor 210 may verify whether a value of the at least one performance parameter of the first AP 204 is lower than or greater than a corresponding performance parameter of the second AP 206 and/or the third AP 208. In one example, the processor 210 may verify whether a value of the RSS corresponding to the first AP 204 is greater than or lower than a value of the RSS corresponding to the second AP 206. It may be noted that in the context of comparing the performance parameters of the first AP and the second AP, the term "greater than" may be referred to as "better than" and the term "lower than" may be referred to as "weaker than" in the present specification.

Further, based on the evaluation of the one or more performance parameters of the first AP 204 and/or the second AP 206, the processor 210 may identify an aggressive roaming or a sticky roaming of the client device 202 in the communication network 200. The aspect of identifying the aggressive roaming and the sticky roaming of the client device 202 will be explained in greater detail with reference to FIGS. 3 and 4. In one example, the processor 210 may include one or more of an arithmetic logic unit, a microprocessor, a general purpose controller, and a processor array to perform desired computations/functions. While the processor 210 is shown as a single unit, in certain embodiments, the processor 210 may include more than one processor co-located or distributed in different locations. In one embodiment, a non-transitory computer readable medium may be encoded with a program having a sequence of instructions to instruct the processor 210 to perform desired computations/functions.

Referring to FIG. 3, a flow chart 300 illustrating a method for evaluating non-optimal roaming of the client device by detecting an aggressive roaming state of the client device in a communication network, in accordance with aspects of the present specification, is depicted. For ease of understanding, the method 300 is described with reference to the components of FIGS. 1 and 2.

The method 300 begins with a step 302, where a transition of a client device 202 from a first AP 204 to a second AP 206 in a determined time interval or a connection of the client device 202 with the second AP 206 from a disconnected state is detected. In one example, the disconnected state may be representative of a state where the client device 202 is not connected to any of the APs 202, 204, 206 in the communication network 200. In certain embodiments, the transceiver 212 along with the processor 210 in the client device 202 may be employed to detect that the client device 202 has transitioned from the first AP 204 to the second AP 206 in the determined time interval or has established a connection with the second AP 206 from the disconnected state. In one example, the client device 202 may use one or more roaming algorithms to transition from the first AP 204 to the second AP 206 or to establish the connection with the second AP 206 from the disconnected state. Furthermore, in this example, the first AP 204 that is currently associated with the client device 202 may be referred to as a current AP. Also, the second AP 206 to which the client device 202 may transition from the current AP (the first AP 204) may generally be referred to as a new AP.

At step 302, if it is detected that the client device 202 has transitioned from the first AP 204 to the second AP 206 in the determined time interval or has established a connection with the second AP 206 from the disconnected state, control is passed to step 304. However, at step 302, if it is confirmed that the client device 202 did not transition from the first AP 204 to the second AP 206 in the determined time interval or failed to establish a connection with the second AP 206 from the disconnected state, where the processor 210 may monitor for a new transition of the client device 202.

Subsequently, at step 304, the processor 210 in the client device 202 may perform another check to verify if the client device 202 was connected or communicatively coupled to the first AP 204 before transitioning to the second AP 206. In one example, the processor 210 may determine if the client device 202 was connected to the first AP 204 by verifying whether the client device 202 was connected with the first AP 204 to communicate application data to the first AP 204. If the client device 202 had been connected with and/or communicated the application data to the first AP 204, the processor 210 may confirm that the client device 202 was connected to the first AP 204 before transitioning to the second AP 206.

Further, if at step 304 it is verified that the client device 202 was connected to the first AP 204 before transitioning to the second AP 206, control is passed to step 306. However, at step 304, if it is confirmed that the client device 202 was not connected to the first AP 204 before transitioning to the second AP 206, control may be passed back to step 302, where the processor 210 may monitor the client device 202 for a new transition.

Subsequently, at step 306, the processor 210 in the client device 202 may evaluate at least one performance parameter of the first AP 204. As previously noted, the performance parameters may include a received signal strength (RSS), data latency, and data loss associated with the first AP 204. It may be noted that values associated with the performance parameters of the first AP 204 are stored in the memory 214 of the client device 202.

Additionally, the processor 210 may retrieve the value of the at least one performance parameter from the memory 214. Furthermore, the processor 210 may compare this value of the at least one performance parameter with a predefined threshold value to evaluate the performance of the at least one performance parameter. In one example, the processor 210 may verify if the value of the at least one performance parameter is lower than the predefined threshold value. Accordingly, at step 306, if it is verified that the value of the at least one performance parameter is lower than the predefined threshold value, control is passed to step 310.

However, at step 306, if it is determined that the value of the at least one performance parameter is greater than or equal to the predefined threshold value, control is passed to step 308. It may be noted that in the embodiment of evaluating only one performance parameter of the first AP 204, control is passed to step 308 if that particular performance parameter is greater than or equal to the predefined threshold value. However, in the embodiment where at step 306 more than one performance parameter or all the performance parameters of the first AP 204 are compared to corresponding predefined threshold values, control is passed to step 308 only if none of these performance parameters are below their corresponding predefined threshold values.

At step 308, the processor 210 in the client device 202 may determine whether a value of the at least one performance parameter of the first AP 204 is greater than a value of a corresponding performance parameter associated with the second AP 206. In one example, the processor 210 may determine whether a value of the RSS of the first AP 204 is greater than a value of the RSS of the second AP 206. Also, the processor 210 may verify whether the first AP 204 is still available for communication with the client device 202. If the value of at least one performance parameter of the first AP 204 is greater than the value of the corresponding performance parameter of the second AP 206 and the first AP 204 is still available for communication with the client device 202, control is passed to step 312. However, at step 308, if it is confirmed that the value of the at least one performance parameter corresponding to the first AP 204 is equal to or lower than the value of the at least one performance parameter corresponding to the second AP 206, and/or the first AP 204 is unavailable for communication with the client device 202, control may be passed back to step 302.

At step 312, the processor 210 may identify occurrence of an undesirable roam event of the client device 202 in the communication network 200 based on the comparison of step 308. Also, the processor 210 may increment a count of this undesirable roam event. In one example, the processor 210 may use a counter to track the number of undesirable roam events. Accordingly, on occurrence of an undesirable roam event, the processor 210 may increment the counter. Control may be transferred to step 316.

Referring now to step 310, the processor 210 may determine whether the client device 202 had been transitioned from the second AP 206 to the first AP 204 prior to transitioning from the first AP 204 to the second AP 206. Particularly, the processor 210 may verify whether the client device 202 was initially coupled to the second AP 206 before transitioning from the first AP 204. At step 310, if it is verified that the client device 202 was initially coupled to the second AP 206, control is passed to step 314.

At step 314, the processor 210 may confirm that the client device 202 is transitioning or flip-flopping between the first AP 204 and the second AP 206. In this situation, the processor 210 may determine that a flip-flop event of the client device 202 has occurred in the communication network 200. Further, the processor 210 may increment a count of this flip-flop event, as depicted in step 314. In one example, the processor 210 may employ a counter to track a number of flip-flop events. Accordingly, in the event of occurrence of a flip-flop event, the processor 210 may increment the count in a counter that is associated with the flip-flopping events. However, at step 310, if the processor 210 determines that the client device 202 had not been transitioned from the second AP 206 to the first AP 204 prior to transitioning from the first AP 204 to the second AP 206, control is passed back to step 302, where the processor 210 may monitor for a new transition of the client device 202. Control may be transferred to step 316.

Subsequently, at step 316, the processor 210 may verify whether the number of undesirable roam events and/or the number of flip-flop events is greater than a corresponding threshold value. In one example, the processor 210 may obtain the counts associated with the number of undesirable roam events and/or the number of the flip-flop events from corresponding counters. Additionally, in one embodiment, the processor 210 may verify whether these undesirable roam events and/or flip-flop events occurred within a predefined time period. In one non-limiting example, the predefined time period may be in a range from about 30 seconds to about 5 minutes. If the number of undesirable roam events and/or the number of flip-flop events is greater than the corresponding threshold values within the predefined time period, the processor 210 may identify an aggressive roaming state of the client device 202 in the communication network 200, as indicated by step 318. However, at step 316, if it is determined that the number of undesirable roam events and/or the number of flip-flop events is lower than the corresponding threshold values, control is passed back to step 302, where the processor 210 monitors for a new transition of the client device 202.

In addition, as indicated by step 320, once the aggressive roaming state of the client device 202 is identified, the client device 202 may notify a user of the client device 202 to modify the roaming algorithm to achieve optimal roaming of the client device 202 in the communication network 200. This modification in the roaming algorithm aids in reducing roaming time and/or roaming process of the client device 202. In one embodiment, the client device 202 may log or store data related to aspects or events that cause poor roaming performance of the client device 202. Further, these aspects and events may be used by the user to analyze the performance and/or to determine any cause of failure of the client device 202 at a later time.

Consequently, application data may be communicated between the client device 202 and the APs without interruption or data loss. In accordance with aspects of the present specification, steps 302-320 may be repeated to monitor for any other undesirable roam events and/or flip-flop events in the communication network 200. In one embodiment, the client device 202 may continuously or periodically monitor for undesirable roam events and/or flip-flop events in the communication network 200 to identify the aggressive roaming state of the client device 202. In addition, the client device 202 may also display one or more messages that indicate the aggressive roaming state of the client device 202 to the user.

Thus, implementing the exemplary client device 202 as described hereinabove aids in monitoring for undesirable roam events and/or flip-flop events of the client device 202, which in turn aids in identifying the aggressive roaming state of the client device 202 in the communication network 200.

Turning now to FIG. 4, a flow chart 400 illustrating a method for evaluating non-optimal roaming of the client device by detecting a sticky roaming state of the client device in a communication network, in accordance with aspects of the present specification. For ease of understanding, the method 400 is described with reference to the components of FIGS. 1 and 2.

The method 400 begins at step 402, where the processor 210 in the client device 202 may verify whether the client device 202 transitioned from a first AP to a second AP in a determined time interval. Also, the processor 210 may verify whether the client device 202 established a connection with the second AP from a disconnected state of the client device 202. As previously noted, the disconnected state may be representative of a state where the client device is not connected to any of the APs in the communication network 200. If the client device 202 has not transitioned from the first AP 204 to the second AP 206 in the determined time interval or if the client device 202 failed to establish a connection with the second AP from the disconnected state, control is passed to step 404. However, at step 402, if it is confirmed that the client device 202 has transitioned from the first AP 204 to the second AP 206 or that the client device 202 has established a connection with the second AP from the disconnected state, control may be passed back to step 402.

Subsequently at step 404, the processor 210 in the client device 202 may compare at least one performance parameter corresponding to the first AP 204 to a predefined threshold value. In one example, the processor 210 may determine whether a value of at least one performance parameter corresponding to the first AP 204 is lower than the predefined threshold value. If it is determined that the value of the at least one performance parameter of the first AP 204 is lower than the predefined threshold value, control is passed to step 406. However, at step 404, if it is determined that the at least one performance parameter of the first AP 204 is greater than or equal to the predefined threshold value, control is passed to step 402. It may be noted that in the embodiment of evaluating only one performance parameter of the first AP 204, control is passed to step 402 if that particular performance parameter is greater than or equal to the predefined threshold value. However, in the embodiment where at step 404 more than one performance parameter or all the performance parameters of the first AP 204 are compared to corresponding predefined threshold values, control is passed to step 402 only if none of these performance parameters are below their corresponding predefined threshold values.

At step 406, the processor 210 may determine whether the client device 202 scanned for the second AP 206 within the determined time interval. If it is determined that the processor 210 of the client device 201 failed to scan for the second AP 206 within the determined time interval, control is passed to step 408, where the processor 210 may confirm that a non-scan event has occurred in the communication network 200. Additionally, the processor 210 may increment a count of non-scan event. In one example, the processor 210 may use a counter to track the number of non-scan events. Accordingly, on occurrence of a non-scan event, the processor 210 may increment the counter. Control may be transferred to step 414. However, at step 406, if it is determined that the processor 210 has scanned for the second AP 206 within the determined time interval, control is passed to step 410.

Further at step 410, the processor 210 may determine whether a value of the at least one performance parameter of the second AP 206 is greater than a value of a corresponding performance parameter of the first AP 204. In one example, the processor 210 may determine whether the RSS or signal strength of the second AP 206 is greater than the RSS or signal strength of the first AP 204. Also, the processor 210 may verify whether the second AP 206 is available for communicating with the client device 202. If the at least one performance parameter of the second AP 206 has a value that is greater than a value of the corresponding performance parameter of the first AP 204 and the second AP 206 is available, control is passed to step 412, where the processor 210 may confirm that a non-roam event has occurred in the communication network 200. Also, the processor 210 may increment a count of non-roam event. In one example, the processor 210 may use a counter to track the number of non-roam events. Accordingly, on occurrence of a non-roam event, the processor 210 may increment the counter. Control may be transferred to step 414. However, at step 410, if it is determined that a value of the at least one performance parameter of the second AP 206 has a value that is lower than or equal to a value of the corresponding performance parameter of the first AP 204 and/or the second AP 206 is not available, control is passed back to step 402.

Referring now to step 414, the processor 210 may verify whether a number of the non-roam events or a number of the non-scan events is greater than a corresponding threshold value. In one example, the processor 210 may monitor the counter associated with the non-roam events and the counter associated with the non-scan events to determine the number of non-roam events and/or number of non-scan events. Also, in one embodiment, the processor 210 may verify whether the non-roam events and/or non-scan events occurred within a predefined time period.

If the number of non-roam events and/or the number of non-scan events are greater than the corresponding threshold values within the predefined time period, the processor 210 may identify a sticky roaming state of the client device 202 in the communication network 200, as depicted in step 416. However, at step 414, if it is determined that the number of non-roam events and/or the number of non-scan events are lower than or equal to the corresponding threshold value, control is passed back to step 402.

Moreover, as indicated by step 418, once the sticky roaming state of the client device 202 is identified, the client device 202 may inform the user of the client device 202 to modify the roaming algorithm to achieve optimal roaming in the communication network 200. This modification in the roaming algorithm aids in reducing roaming time and/or roaming process of the client device 202.

In accordance with aspects of the present specification, steps 402-418 may be repeated to monitor for any other non-scan events and/or non-roam events in the network 200. In one embodiment, the client device 202 may continuously or periodically monitor for non-roam events and/or non-scan events in the network 200 to identify the sticky roaming state of the client device 202. In addition, the client device 202 may display one or more messages that indicate the sticky roaming state of the client device 202 to the user.

Therefore, implementing the exemplary client device 202 as described hereinabove aids in monitoring for non-roam events and/or non-scan events of the client device 202, which in turn aids in identifying the sticky roaming state of the client device 202 in the communication network 200.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

The various embodiments of the exemplary systems and methods presented hereinabove aid in identifying the non-optimal roaming states such as the aggressive roaming state and the sticky roaming state of the client device in the communication network. Also, by identifying the aggressive roaming state and/or the sticky roaming state, the client device may be configured to manually or automatically change or adjust one or more roaming algorithms to reduce/minimize roaming time and/or the roaming process of the client device to achieve an optimal roaming state in the communication network. In addition, the client device may display one or more messages that indicate the aggressive roaming state and/or the sticky roaming state of the client device. Furthermore, the client device may collect data associated with the aggressive roaming state and/or the sticky roaming state of the client device for each of the roaming algorithms used in the network. The client device may use this data to evaluate the effectiveness of each roaming algorithm in the communication network, thereby enabling the client device to make a more informed choice/selection of a roaming algorithm.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method for evaluating non-optimal roaming of a client device in a communication network, the method comprising:
   detecting a transition of the client device from a first access point to a second access point in the communication network;
   evaluating at least one performance parameter corresponding to each of the first access point and the second access point after the client device transitions from the first access point to the second access point, wherein evaluating the at least one performance parameter comprises:
   verifying that a value of the at least one performance parameter of the first access point is greater than a value of a corresponding performance parameter of the second access point; and
   confirming availability of the first access point for communication with the client device when the client device is transitioned from the first access point to the second access point;
   determining a number of one of flip-flop events and undesirable roam events based on the evaluation of the at least one performance parameter corresponding to each of the first access point and the second access point;

identifying the non-optimal roaming of the client device based on one of the number of flip-flop events and the number of the undesirable roam events; and modifying at least one roaming algorithm associated with the client device to achieve optimal roaming of the client device in the communication network.

2. The method of claim 1, wherein the non-optimal roaming of the client device comprises an aggressive roaming state of the client device.

3. The method of claim 1, further comprising, prior to evaluating the at least one performance parameter corresponding to each of the first access point and the second access point, verifying that the client device is communicatively coupled to the first access point before transitioning from the first access point to the second access point.

4. The method of claim 3, wherein evaluating the at least one performance parameter corresponding to each of the first access point and the second access point comprises:

verifying that the value of the at least one performance parameter of the first access point is lower than a predefined threshold value; and confirming that the client device is transitioned from the second access point to the first access point prior to transitioning from the first access point to the second access point.

5. The method of claim 4, wherein determining the number of flip-flop events comprises incrementing a count of the flip-flop events if the client device is transitioned from the second access point to the first access point prior to transitioning from the first access point to the second access point.

6. The method of claim 1, wherein determining the number of undesirable roam events comprises incrementing a count of the undesirable roam events if the value of the at least one performance parameter of the first access point is greater than the value of the corresponding performance parameter of the second access point and the first access point is available for communication with the client device.

7. The method of claim 1, wherein identifying the non-optimal roaming of the client device comprises:

monitoring at least one of the number of flip-flop events and the number of undesirable roam events during a determined time interval; and identifying the non-optimal roaming of the client device based on a comparison of the number of flip-flop events or the number of undesirable roam events within the determined time interval with a threshold value.

8. A client device for evaluating non-optimal roaming in a communication network, the client device comprising:

a transceiver configured to detect that the client device is transitioned from a first access point to a second access point in the communication network;

a processor coupled to the transceiver and configured to:

evaluate at least one performance parameter corresponding to each of the first access point and the second access point after the client device transitioned from the first access point to the second access point;

verify that a value of the at least one performance parameter of the first access point is greater than a value of a co responding performance parameter of the second access point;

confirm availability of the first access point for communication with the client device when the client device is transitioned from the first access point to the second access point;

determine a number of one of flip-flop events and undesirable roam events based on the evaluation of the at least one performance parameter corresponding to each of the first access point and the second access point;

identify the non-optimal roaming of the client device based on one of the number of flip-flop events and the number of undesirable roam events; and modify at least one roaming algorithm associated with the client device to achieve optimal roaming of the client device in the communication network.

9. The client device of claim 8, wherein the non-optimal roaming of the client device comprises an aggressive roaming state of the client device.

10. The client device of claim 8, wherein the processor, prior to evaluating the at least one performance parameter corresponding to each of the first access point and the second access point, is configured to verify that the client device is communicatively coupled to the first access point before transitioning from the first access point to the second access point.

11. The client device of claim 8, wherein the processor is configured to:

verify that the value of the at least one performance parameter of the first access point is lower than a predefined threshold value;

confirm that the client device transitioned from the second access point to the first access point prior to transitioning from the first access point to the second access point; and increment a count of the flip-flop events if the client device transitioned from the second access point to the first access point prior to transitioning from the first access point to the second access point.

12. The client device of claim 8, wherein the processor is configured to:

increment a count of the undesirable roam events if the value of the at least one performance parameter of the first access point is greater than the value of the corresponding performance parameter of the second access point and the first access point is available for communication with the client device.

13. The client device of claim 8, wherein the processor is configured to:

monitor the number of flip-flop events or the number of undesirable roam events during a determined time interval; and identify the non-optimal roaming of the client device based on a comparison of the number of flip-flop events or the number of undesirable roam events within the determined time interval with a threshold value.

* * * * *